United States Patent [19]

Kurzenberger

[11] 3,930,345

[45] Jan. 6, 1976

[54] MOBILE HOME RESILIENT FROST HEAVE COMPENSATORS

[76] Inventor: Richard H. Kurzenberger, 217 Sing Sing Road, Horseheads, N.Y. 14845

[22] Filed: Jan. 31, 1975

[21] Appl. No.: 545,983

[52] U.S. Cl. .................... 52/23; 105/469; 105/473; 248/499; 267/70; 280/179 A
[51] Int. Cl.² .............. B61D 45/00; E02D 27/50; F16F 1/44; F16F 3/08
[58] Field of Search ............... 52/23; 105/469, 473; 248/499; 267/70; 280/150 R, 179 A; 296/23 MC, 35 A

[56] References Cited
UNITED STATES PATENTS

| | | | |
|---|---|---|---|
| 99,320 | 2/1870 | Jones | 267/70 |
| 315,223 | 4/1885 | Belding | 267/71 |
| 777,441 | 12/1904 | Small | 52/23 |
| 1,194,417 | 8/1916 | Pelham | 267/72 |
| 2,212,153 | 8/1940 | Eaton et al. | 267/70 |
| 3,054,151 | 9/1962 | Shankland | 52/23 |
| 3,335,531 | 8/1967 | Grimelli et al. | 52/23 |
| 3,402,925 | 9/1968 | Schwiebert | 267/71 |
| 3,744,192 | 7/1973 | Burnett | 52/23 |

FOREIGN PATENTS OR APPLICATIONS

| | | | |
|---|---|---|---|
| 16,472 | 7/1904 | United Kingdom | 267/71 |
| 56,029 | 4/1891 | Germany | 267/72 |

Primary Examiner—Robert J. Spar
Assistant Examiner—Howard Beltran
Attorney, Agent, or Firm—Everett G. Wright

[57] ABSTRACT

A frost heave compensator for mobile homes and the like generally supported on a steel frame disposed below floor level, which steel frame is in turn supported on concrete or other relatively shallow footings. Each mobile home is provided with a plurality of longitudinally spaced resiliently compensating tie-downs disposed transversely across the top thereof and extending vertically downwardly on opposite sides thereof.

4 Claims, 9 Drawing Figures

U.S. Patent   Jan. 6, 1976   Sheet 1 of 2   3,930,345
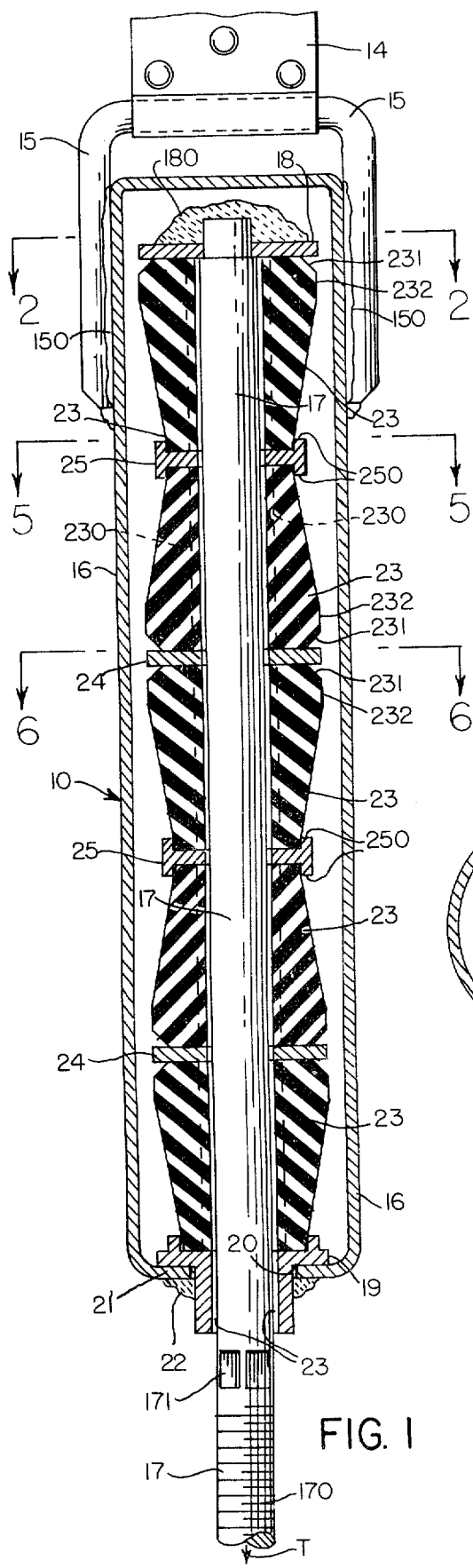
FIG. 1
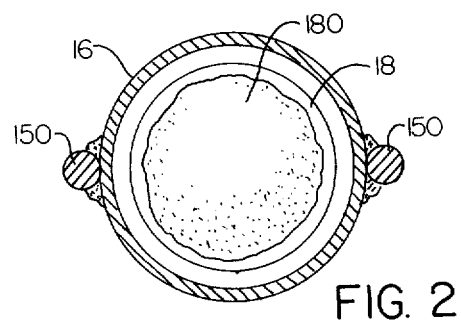
FIG. 2
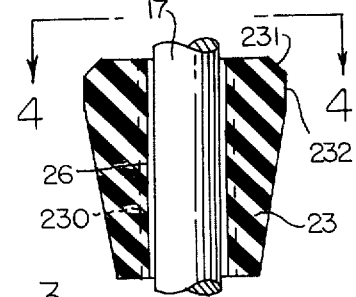
FIG. 3
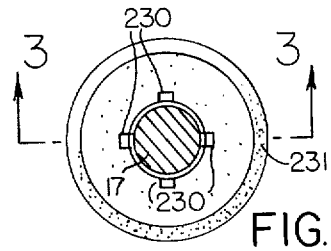
FIG. 4
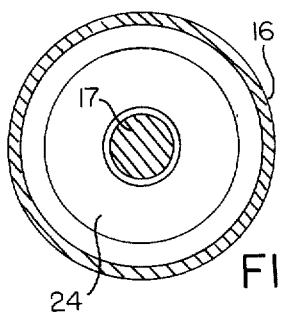
FIG. 5
FIG. 6
FIG. 7

MOBILE HOME RESILIENT FROST HEAVE COMPENSATORS

The depending end of each tiedown is secured to the closed upper end portion of the tubular shell of a frost heave compensator of the invention. A central tension rod is disposed substantially centrally within the said tubular shell and has a combined circular guide and stop washer secured centrally on the upper end thereof, which tension rod extends downwardly therefrom and is disposed freely through a central aperture provided in the bottom end portion of the said frost heave compensator, and is connected to the upper end of a suitable ground anchor. A plurality of natural or synthetic rubber resilient compressible oppositely ended frusto-conical compression elements tapered in opposite directions with suitable washers therebetween are freely telescoped over the said central tension rod within the tubular shell of the frost heave compensator.

When one or the other of the longitudinal sides of a mobile home is subjected to relatively high velocity winds, sufficient pull is provided on the said central tension rod to resiliently compress the frusto-conical compression elements causing the frost heave compensators on the windward side of the mobile home to prevent an extensive pulling on the side of the mobile home facing the high velocity wind pressure, thereby eliminating or reducing wind damage to the mobile home.

BRIEF SUMMARY OF THE INVENTION

Frost heave compensators of the instant invention are particularly useful in the anchoring down of mobile homes whereby to eliminate or materially reduce extreme damage that may be incurred during relatively high velocity wind storms or during hurricanes.

Most mobile homes are anchored against damage by high velocity storms by employing a plurality of longitudinally spaced transversely disposed tiedowns disposed over the top of the mobile home and down the sides thereof at selected intervals depending upon the width and length of the mobile home. The ends of the tiedowns are each normally secured to a suitable ground anchor disposed to a depth of four to five feet below ground level, each said ground anchor preferably withstanding a pull of at least up to 5,000 pounds. The size and type of ground anchors employed are generally selected according to the type of soil in which they are to be used.

The frost heave compensator of the instant invention consists of a preferably steel outer shell having a closed upper end including means thereon to accommodate the securement thereto of the lower end of a conventional tiedown.

Within the tubular outer shell of the frost heave compensator is a central shaft having an upper circular guide and stop washer firmly secured on the upper end thereof, the lower end of said central shaft extending downwardly in relatively free relationship through the lower end of the said central outer shell. A plurality of oppositely ended resilient compressible frusto-conical compression elements preferably formed of natural or synthetic rubber into frusto-conical internally fluted spools are telescopingly positioned freely on said central shaft with suitable washers therebetween, and are retained thereon by suitable means employed at the lower end portion of said outer shell, the said central shaft being substantially free from engagement by said spools when under compression.

After assembly, the lower end of the outer shell of the frost heave compensator is closed except for a central aperture provided in the bottom thereof through which the lower threaded end of the central shaft freely extends, which threaded shaft is turnable whereby to engage and be secured to the upper end of a preferably vertically disposed ground anchor engaged in the ground below the lower end of a tiedown to which a frost heave compensator has been secured.

BRIEF DESCRIPTION OF THE DRAWINGS

Referring now to the drawings wherein like reference characters refer to like and corresponding parts throughout the several views:

FIG. 1 is a vertical sectional view of a mobile home frost heave compensator of the invention showing a preferred arrangement of the elements thereof;

FIG. 2 is a horizontal sectional view taken on the line 2—2 of FIG. 1;

FIG. 3 is a vertical sectional view of a typical resilient natural or synthetic rubber vertically fluted compression element telescoped in freely spaced relationship on the tension rod employed within the tubular shell of a frost heave compensator;

FIG. 4 is a horizontal sectional view taken on the line 4—4 of FIG. 3;

FIG. 5 is a horizontal sectional view taken on the line 5—5 of FIG. 1 showing the use of a flat washer disposed between the small ends of opposite ended compression elements, said washer having integral vertical upper and lower shoulders therearound;

FIG. 6 is a horizontal sectional view taken on the line 6—6 of FIG. 1 showing the use of a flat washer between the large ends of opposite ended compression elements;

FIG. 7 is a fragmentary vertical sectional view showing a preferred alternate construction that may be employed at the lower end of the tubular shell of the frost heave compensator;

DESCRIPTION OF A PREFERRED EMBODIMENT OF THE INVENTION

Figure 8:
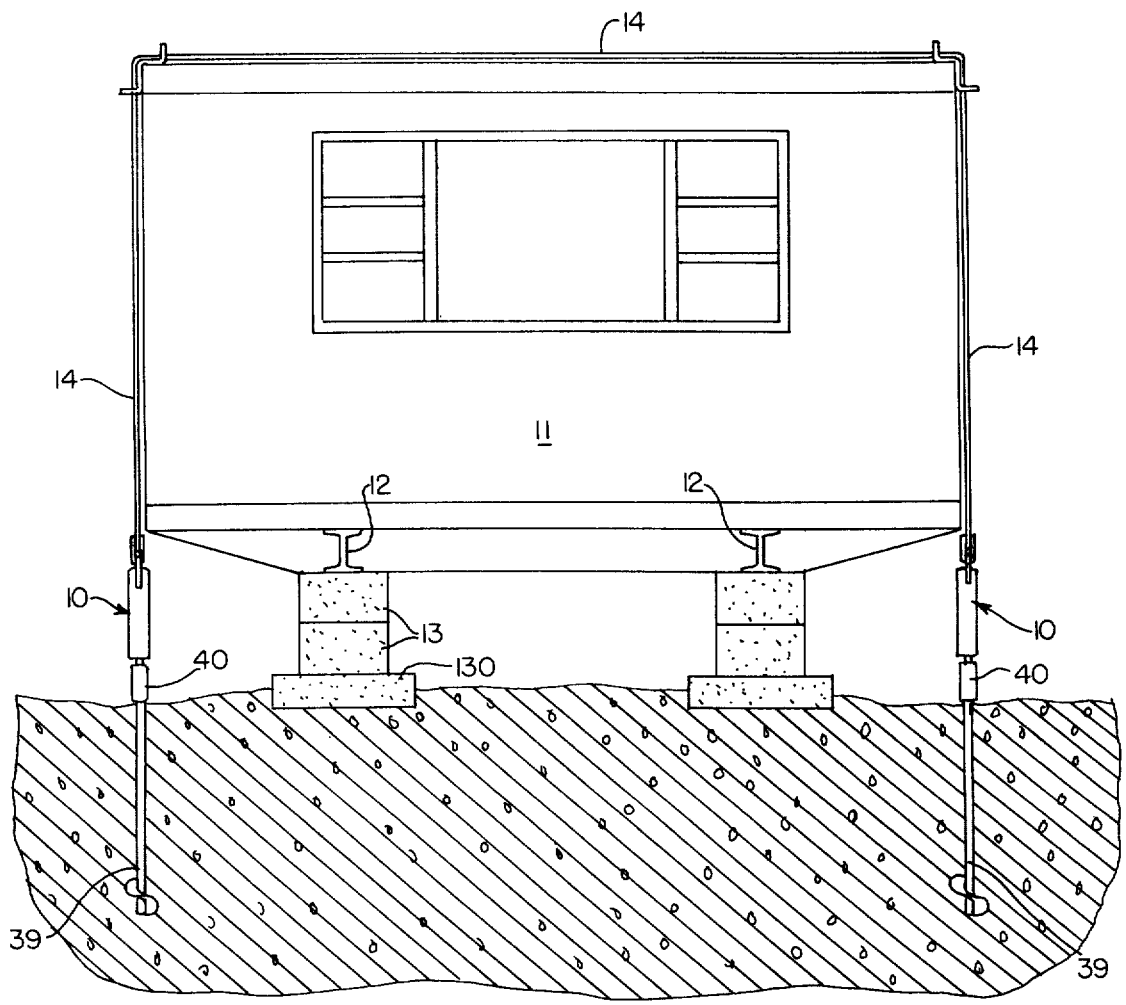
FIG. 8 is an end elevational view of a typical mobile home showing a pair of transversely spaced longitudinal main frame elements supported on pairs of concrete footings located at selected longitudinal intervals therebelow, and showing a tiedown disposed transversely across the top of the mobile home and depending on opposite sides thereof where the ends of the tiedown are each connected to the upper end of a frost heave compensator which in turn is connected to the upper end of a ground anchor therebelow.

FIG. 1 shows a preferred embodiment of a frost heave compensator 10 of the invention for mobile homes 11 and similar structures generally twelve to fourteen feet wide and fifty to seventy feet long usually supported on a steel frame 12 disposed below floor level, which steel frame 12 is in turn supported on relatively small concrete blocks 13 and shallow footings 130. Each mobile home 11 is generally provided with a plurality of longitudinally spaced tiedowns 14 extending transversely across the top and vertically downwardly on opposite sides thereof. Each depending end of each said tiedown 14 is connected to an inverted U-shaped transverse bracket 15 or the like preferably welded at 150 to the upper closed end portion of the tubular shell 16 of a frost heave compensator 10.

A tension rod 17 is disposed centrally within the tubular shell 16 of the frost heave compensator 10 and has a combined circular guide and stop washer 18 securely fixed on the upper end thereof by welding 180 or the like. The said combined circular guide and stop washer 18 is somewhat smaller in diameter than the inner diameter of the tubular shell 16 of the frost heave compensator 10 and maintains the upper end portion of the central tension rod 17 reasonably central at all times.

As best shown in FIG. 1, the lower end portion 170 of the tension rod 17 is telescoped freely through a combined central sleeve and annular seat 19 positioned centrally of an aperture 20 provided in the lower end 21 of the tubular shell 16 of the frost heave compensator 10. A suitable clearance 22 is provided between the tension rod 17 and the central aperture 23 in the combined central sleeve and annular seat 19 whereby to permit free telescoping of the tension rod 17 therethrough.

In the particular embodiment of the invention disclosed herein, the portion of the tension rod 17 normally disposed within the tubular shell 16 of the frost heave compensator 10 is provided with a plurality (preferably five) longitudinally oppositely ended resilient compressible frusto-conical compression elements 23 telescoped on said tension rod 17 with sufficient space disposed between the outer diameter of said tension rod 17 and the inner diameter of the said compression elements 23 whereby to permit proper functioning thereof when and as compressed responsive to tension T applied to said tension rod 17.

As viewed in FIG. 1, the large adjacent ends of the frusto-conical opposite ended compression elements 23 have a suitable flat washer 24 therebetween. The small adjacent ends of the frusto-conical opposite ended compression elements 23 have a suitable smaller flat washer 25 therebetween with a relatively narrow continuous vertical upper and lower integral shoulder 250 therearound whereby to prevent possible excessive radial expansion of the relatively small circular ends of compression elements 23 when extremely heavy tension is applied to the tension rod 17. Each said frusto-conical compression element 23 has a central longitudinal aperture 26 therethrough of sufficient size to permit it to be freely axially telescoped in opposite ended relationship on the tension rod 17 with flat and shouldered washers disposed alternately therebetween.

The inner circular wall of each compressible frusto-conical compression element 23 is preferably provided with four equally spaced vertical inner flutes 230 as best shown in FIG. 4, which flutes 230 provide reasonable inner flexibility of the compression elements 23.

The large end of each frusto-conical compression element 23 is preferably beveled therearound at 231, and the outer periphery of said compression element 23 is preferably vertically formed therearound for a short distance at 232 below said bevel 231 whereby to provide an upper annular vertical shoulder just above the beginning of the inwardly tapered lower portion of the said compression element 23.

Referring now to FIG. 7 which discloses an alternate construction that may be employed at the lower end portion of the tubular shell 16 of the frost heave compensator 10 wherein the lower end of the tubular shell 16 is transversely cut off, and the lower end portion of the tubular shell 16 is threaded at 30 to accommodate an internally threaded inverted lower cap element 31 thereon.

The lower end portion of the tension rod 17 is telescoped freely through a combined central depending sleeve 32 and annular seat 33, which central sleeve 32 is externally threaded at 37 and is telescoped downwardly through a central aperture 34 provided therefor in the bottom of the said annular seat 33 to rest centrally upon the said inverted cap element 31. The upper surface of the annular seat 33 is provided with an upwardly disposed integral annular rib 35 located centrally thereon within which the lower annular end 236 of the lowermost frusto-conical compression element 23 is positioned.

The central depending sleeve portion 32 of the combined central depending sleeve 32 and annular seat 33 is suitably threaded at 37 to accommodate a nut 38 thereon which functions to removably close the lower end of the tubular shell 16 and yet permits longitudinal movement of the tension rod 17 with respect to the compression of the elements 23 of the frost heave compensator 10.

The tension rod 17 is preferably formed hexagonally at 171 to accommodate a suitable wrench with which the said tension rod 17 may be turned to secure its threaded lower end 170 thereof into a suitable connector element 40 conventionally employed at the upper end of a ground anchor 39.

Reference is now made to FIG. 8 which shows a typical use of frost heave compensators 10 of the invention in combination with a mobile home 11 and conventional tiedowns 14 transversely disposed across the top of the mobile home 11 and down the sides thereof at selected intervals inwardly of the extreme ends of the mobile home.

The mobile home 11 is conventionally supported on a pair of laterally spaced longitudinal steel frame elements 12 which are preferably supported on concrete blocks 13 and relatively shallow footings 130 located under each of the longitudinal steel frame elements 12 disposed transversely in parallelism with each tiedown 14.

The upper end of each frost heave compensator 10 is suitably secured to the lower end of a tiedown 14, and the lower end of each said frost heave compensator 10 is connected by means of a suitable connector element 40 to the upper end of a ground anchor 39.

Figure 9:
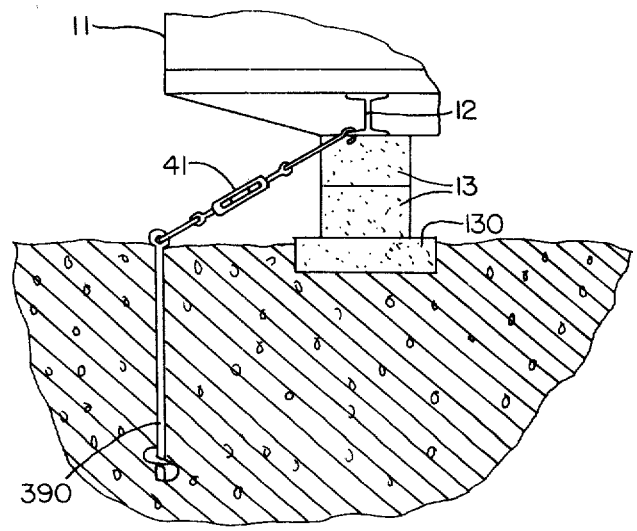
FIG. 9 is a fragmentary sectional view of the anchorage of a longitudinal main frame element connected to a preferably vertical below-the-ground anchor element, which anchorage may be employed at selected locations where additional anchorage may be desirable.

FIG. 9 is a fragmentary view showing a portion of a mobile home 11 supported on a steel frame element 12 by means of concrete blocks 13 and a relatively shallow footing 130 therebelow. A ground anchor 390 is disposed below the outer wall of the mobile home 11 adjacent said steel frame element 12 with a turnbuckle 41 connected at opposite ends to the steel frame element 12 and to the upper end of the ground anchor 390. Such extra anchor-down means may be employed at selected locations around the mobile home 11 wherever circumstances may warrant the employment of special anchor-downs; for example when large and small mobile homes are connected together in an L-shaped or T-shaped unit as ofttimes occurs.

Although but a single embodiment of frost heave compensators of the invention and several modifications of the elements thereof have been disclosed and claimed herein, it is obvious that many changes may be made in the size, shape, arrangement and detail of the several elements thereof without departing from the spirit and scope of the invention as defined by the appended claims.

I claim:

1. A frost heave compensator for mobile homes and the like generally employing longitudinally spaced tiedowns disposed transversely across the top thereof and extending vertically downwardly on opposite sides thereof, said frost heave compensator comprising:
   a. a tubular vertically disposed outer shell closed at its upper end and centrally apertured at its lower end whereby to freely accommodate a tension rod through said lower end,
   b. a transverse inverted U-shaped bracket secured to the upper end portion of said outer shell whereby to admit of securement of the upper end of a frost heave compensator to the lower end of a conventional tiedown,
   c. the upper end of said tension rod having a combined circular guide and stop washer of a diameter somewhat less than the inner diameter of said tubular shell securely fixed on the upper end of said tension rod,
   d. a plurality of longitudinally oppositely ended resilient compressible frusto-conical compression elements telescoped freely on said tension rod with suitable washers disposed between adjacent ends thereof, and with the inner periphery of each said compression elements disposed in spaced relationship with respect to the outer periphery of said tension rod, and with the outer periphery of each said compression element disposed in spaced relationship with respect to the inner periphery of the tubular outer shell,
   e. the lower end of the said outer shell being provided with a combined central sleeve and annular seat positioned centrally in the lower end of the tubular shell, the inner periphery of said combined central sleeve and annular seat being such as to permit free telescoping of the tension rod therethrough, and
   f. the lower end of the said tension rod being threaded and of sufficient length to be adjustably secured by a suitable conventional connector means to the upper end of a conventional ground anchor.

2. A frost heave compensator as claimed in claim 1 wherein:
   a portion of the lower threaded end of the tension rod is preferably hexagonally formed to provide for wrench turning of said tension rod when connected by suitable means to said ground anchor.

3. A frost heave compensator as claimed in claim 1 wherein:
   a. the frusto-conical compression elements, having a central aperture therethrough of sufficient size to telescope freely longitudinally on said tension rod, are each provided with a plurality of longitudinal flutes therein spaced equally therearound.

4. A frost heave compensator as claimed in claim 1 wherein:
   a. the lower portion of the tubular shell is transversely cut off and the remaining lower end of said tubular shell is externally threaded to accommodate an internally threaded cap element thereon,
   b. the said cap element is centrally apertured to receive therethrough the lower depending threaded end of a combined central depending sleeve and annular seat, and
   c. a nut is threaded on the depending end of said central depending sleeve whereby to secure said annular seat element of the combined central depending sleeve and annular seat firmly on the inner surface of said cap around the central aperture therein.

* * * * *